United States Patent
Anlauff

(12) 
(10) Patent No.: US 6,973,185 B2
(45) Date of Patent: Dec. 6, 2005

(54) MOBILE COMMUNICATIONS DEVICE TO BE WORN ON THE WRIST HAVING FLEXIBLE BATTERY STRAP

(75) Inventor: Marcus Anlauff, Braunschweig (DE)

(73) Assignee: Nokia Coroporation, Espoo (FI)

( * ) Notice: Subject to any disclaimer, the term of this patent is extended or adjusted under 35 U.S.C. 154(b) by 657 days.

(21) Appl. No.: 10/036,232

(22) Filed: Dec. 28, 2001

(65) Prior Publication Data

US 2003/0125097 A1 Jul. 3, 2003

(51) Int. Cl.$^7$ ............................................... H04M 1/00
(52) U.S. Cl. ................................................. 379/433.1
(58) Field of Search ...................... 379/433.1; 368/10, 368/13, 292; 455/90.3, 575.1

(56) References Cited

U.S. PATENT DOCUMENTS

| | | | | | |
|---|---|---|---|---|---|
| 4,847,818 A | * | 7/1989 | Olsen | ...................... | 379/433.1 |
| 5,260,915 A | * | 11/1993 | Houlihan | .................. | 379/433.1 |
| 6,158,884 A | * | 12/2000 | Lebby et al. | .................. | 366/10 |

* cited by examiner

Primary Examiner—Jack Chiang
(74) Attorney, Agent, or Firm—Perman & Gree, LLP

(57) ABSTRACT

A mobile communication device is constructed for wearing on the wrist of the user. Pivotable side panels are attached to a body and connected through a flexible band and clasp. The clasp includes a housing in which is contained the power supply of the device. The side panels form a rigid unit when removed from the wrist, and engaged with the clasp/battery housing.

12 Claims, 3 Drawing Sheets

MOBILE COMMUNICATIONS DEVICE TO BE WORN ON THE WRIST HAVING FLEXIBLE BATTERY STRAP

BACKGROUND OF THE INVENTION

Mobile telephones and similar communication devices are becoming more compact and can be stored in a pocket, purse, and myriad other places. Such devices have become so small; that they have become inconspicuous and can be easily misplaced. One common approach is to incorporate a cellular telephone, pager, or other communications device within a wristwatch to provide a dual function device. This has at least one advantage in that the mobile communications device is kept on the wrist and cannot easily be lost. Many of the designs of such "wrist phones", however are awkward and are of limited usefulness as a phone. It is a purpose of this invention to provide a simple mobile communications device which can be comfortably kept on the wrist and which is capable of providing a full function communications device.

SUMMARY OF THE INVENTION

The mobile communications device of this invention is designed to be kept on the wrist, but is not necessarily combined with a watch. Primarily it will be removed from the wrist when used, for example, as a mobile phone. It could remain on the wrist during use with the assistance of an earpiece.

The mobile communication device is constructed having a body that contains the components of the device including a viewable display screen. Side panels are pivotally attached on either side of the body for limited pivotal movement. The panels have a first position in which they extend outward to form a relatively flat unit with the body. A second position in which the panels extend downward from the body in loose conformity with the users wrist.

The device is held on the wrist by a flexible band that engages the side panels. A clasp is provided for connection of the flexible band about the wrist. The clasp includes a housing in which the power supply of the device is contained. When the device is removed from the wrist, the band is collapsed and the housing is engaged to the body. The housing engages the side panels to rigidly hold them in the extended flat position. The clasp is removably secured in such engagement by a snap mechanism. The side panels are constructed with appropriate keypads, installed on their upper surfaces, suitable for the application, i.e., mobile telephone, pager, etc. A microphone and earpiece/speaker are constructed in the bottom of the side panels for use in the extended position. In the extended position off the wrist, the device can be used in a substantially normal fashion without the awkward or unusual orientations of combination wrist watch/telephones of the prior art.

DESCRIPTION OF THE DRAWING

The invention is described in more detail below with reference to the attached drawing in which.

DESCRIPTION OF THE PREFERRED EMBODIMENT

A mobile communications device 10 is constructed having a generally planar body 1 on which is mounted a display screen 2. The interior of body 1 forms an enclosure to house the components of the device. Display screen 2 may be any suitable display, such as a system of LCD's as is well known. The body 1 is designed in compact shape having dimensions consistent with an average size wrist.

Figure 1:
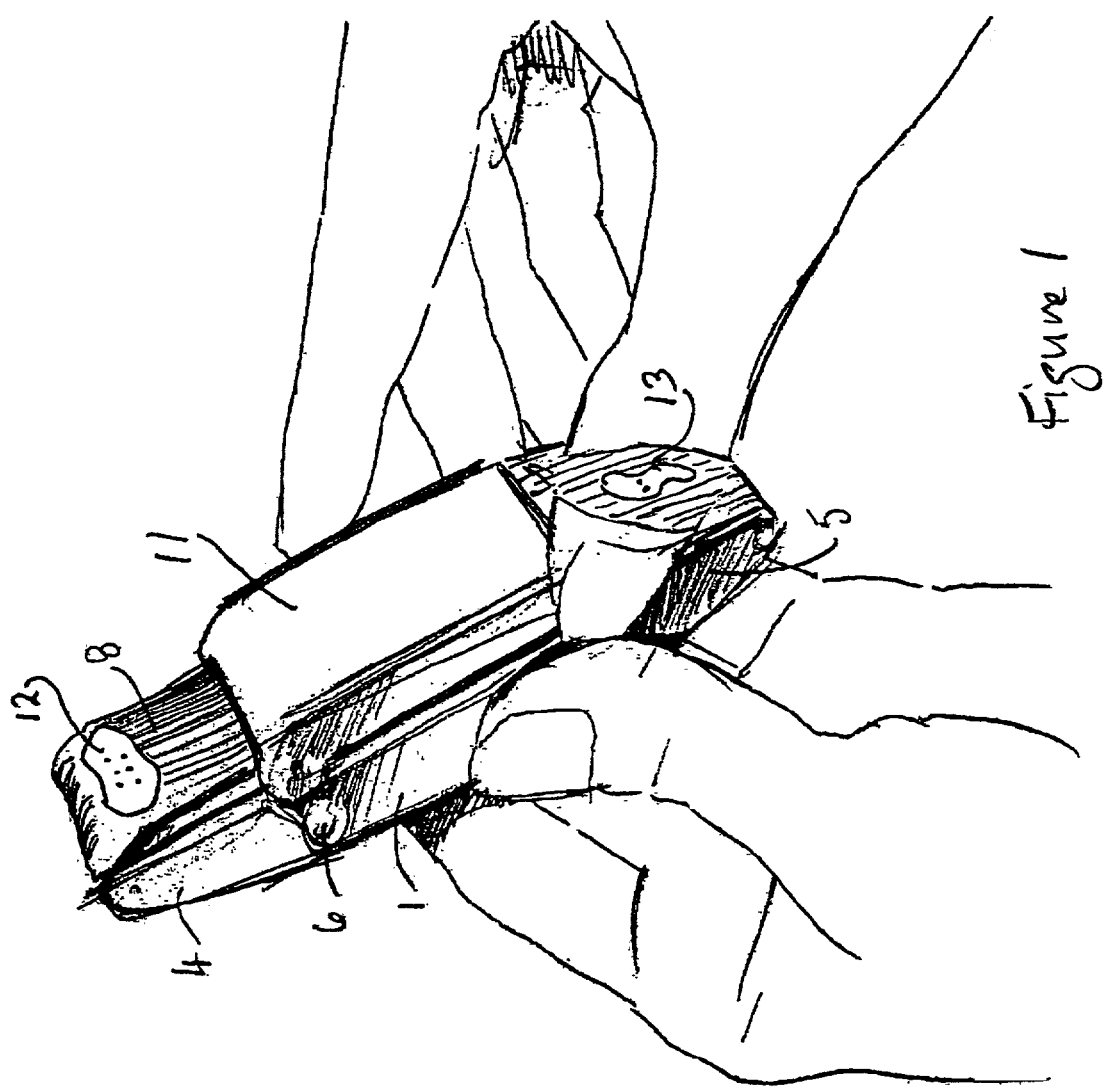
FIG. 1 is a bottom perspective view of the communication device of this invention.
Figure 2:
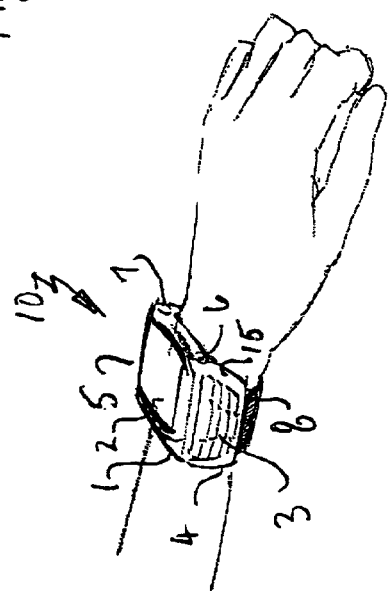
FIG. 2 is a top perspective view from one side of the communication device of this invention, attached to a wrist.
Figure 6:
FIG. 6 is a perspective view of the communication device with the housing fully disengaged
Figure 5:
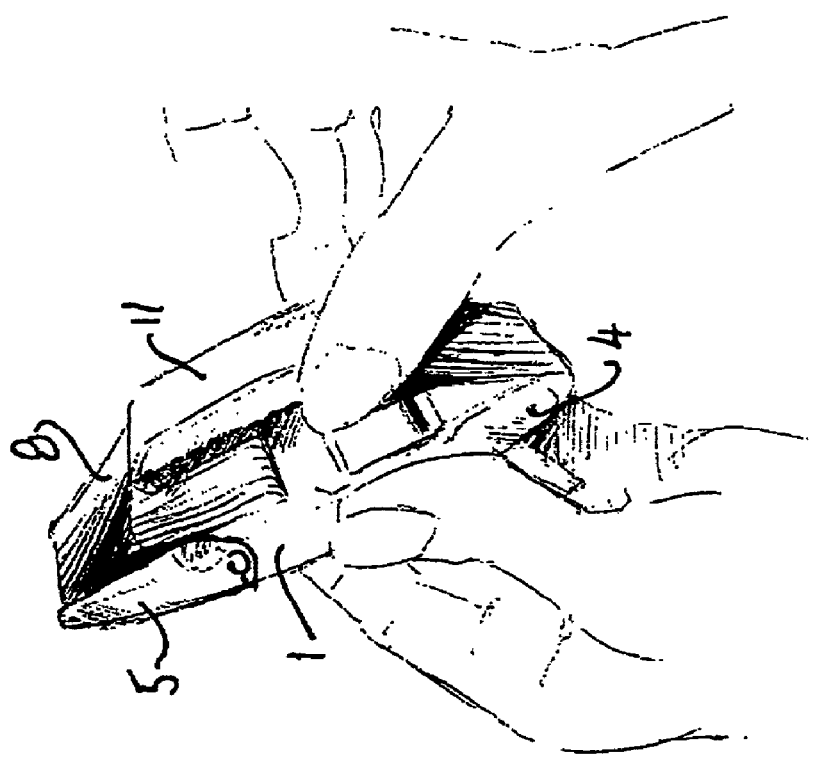
FIG. 5 is a perspective view of the communication device with the housing partially disengaged.

To complete the assembly, side panels 4 and 5 are constructed to provide supportive surfaces for an appropriate user interface such as keypad 3, buttons and the like. These panels are shaped consistent with the body 1 and having dimensions based on the average size wrist. Side panels 4 and 5 are connected on either side of the body 1 by means of hinges 6 and 7 respectively for limited pivotal motion on the body 1, as shown in FIGS. 5 and 6. The pivotal movement has a first position (FIGS. 1 and 5) in which the panels 4 and 5 extend longitudinally, substantially in the plane of body 1, to form a relatively flat assembly. A second position is provided which allows the side panels 4 and 5 to pivot downward in loose conformity with the users wrist, as shown in FIG. 2. Movement upwards of side panels 4 and 5 is restricted by hinges 6 and 7.

A flexible band 8 is provided to secure the mobile communications device 10 on the wrist. The flexible band 8 is connected to the body 1 and extends through slotted eyelets 14 constructed in the side panels 4 and 5. In this way the flexible band 8 engages the wrist directly and forms a comfortable surface for contact with the wrist.

A clasp 9 is provided to releasably connect the band 8 around the user's wrist. Clasp 9 is mounted on a housing 11 that forms a container for the power supply of the device. The power supply includes a battery and appropriate connecting circuitry. The power supply may be connected to the components of device 1 by means of flexible leads woven or imbedded in the band 8. Housing 11 is also sized consistent with a typical wrist.

For general use of the communication device, the device 10 is removed from the wrist and locked in the flat operating arrangement. This is accomplished by collapsing the band 8 and snapping the battery housing 11 into engagement with the body 1 and side panels 4 and 5. When the battery housing 11 is collapsed against the back of mobile communication device 10, a direct connection can be made between the device and the battery. The snap mechanism can be any type of friction fit arrangement that secures the housing 11 in the collapsed position, but allows the user to unsnap the assembly relatively easily to be worn on the wrist. The snap mechanism could be enhance by interacting magnetic parts.

Figure 4:
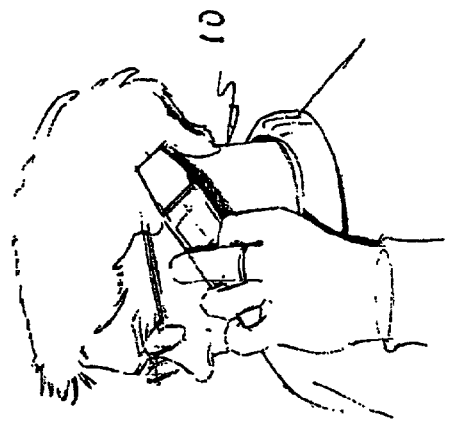
FIG. 4 is a perspective view of the communication device showing its use as a mobile telephone.
Figure 3:
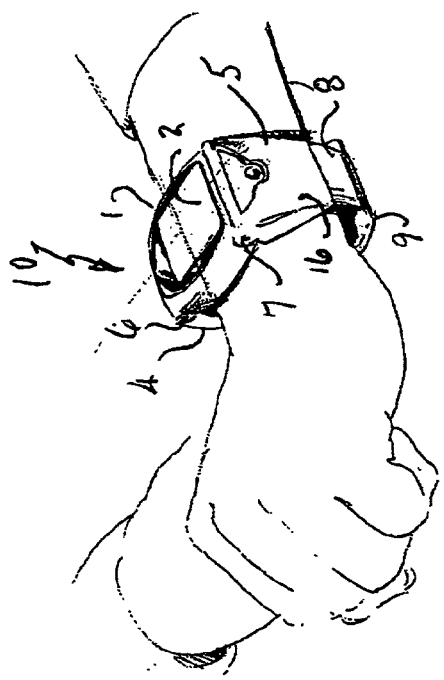
FIG. 3 is a top perspective view from another side of the communication device of this invention, attached to a wrist.

Housing 11 is sized to extent beyond the hinges 6 and 7 and engage the side panels 4 and 5 to force the side panels into a rigid, substantially flat, unit consisting of the body 1, side panels 4 and 5, and battery housing 11. The unit, as shown in FIG. 4, can be used in the standard manner as a cellular telephone. As shown in FIG. 1, a microphone and speaker are constructed on the bottom surface of the side panels 4 and 5. The band 8 may be held to the assembled unit by means of magnetic elements.

The upper surfaces 15 and 16 of side panels 4 and 5 respectively are used to support appropriate keypads 3 operatively connected to the components of the device. A microphone 13 and speaker 12 may be constructed in the bottom of the side panels, as shown in FIG. 1, for use in the extended position, as shown in FIG. 4. The device may be adapted for use while secured to the wrist with the addition of a hands free style earpiece accessory (not shown).

In this manner a communication device, such as a cellular telephone, may be comfortably kept on the wrist in a semi-collapsed state and conveniently removed for use. Upon removable a simple process assembles the device in a flat rigid unit for use according to normal practice.

What is claimed is:

1. A mobile communication device for wearing on the wrist of the user comprising:
   a planar body forming an enclosure in which the components of the mobile communication device are contained, said body further having a display screen mounted on an upper surface in operative connection to said components;
   first and second rigid side panels attached to said body by hinges to provide limited pivotal motion of said side panels with respect to said body, wherein said side panels are moveable between a first position in which said panels extend longitudinally, substantially in the plane of said body and a second position in which said panels extend downward transverse to the plane of said body to partially surround the wrist;
   a flexible band connected to said first and second panels to hold the device on the wrist of the user;
   a housing having a clasp integral therewith, said clasp connected to said flexible band to allow the device to be removably held on said wrist; and
   a battery, forming the power supply for the device, mounted in said housing and connected to said device through said flexible band.

2. A mobile communication device for wearing on the wrist of the user, as described in claim 1, further comprising a keypad connected to the components of the device and mounted on at least one of said side panels.

3. A mobile communication device for wearing on the wrist of the user, as described in claim 1, wherein the device is transformable, when removed from the wrist, to form a rigid substantially planar unit.

4. A mobile communication device for wearing on the wrist of the user, as described in claim 3, wherein, in the transformed position, said clasp housing engages the side panels to force said panels into said first position and to rigidly hold said panels in said first position.

5. A mobile communication device for wearing on the wrist of the user, as described in claim 1, wherein said side panels have a lower surface and a user interface is mounted on said lower surface for use when the device is removed from the wrist and wherein said side panels are in the first position.

6. A mobile telephone for wearing on the wrist of the user comprising:
   a planar body forming an enclosure in which the components of the mobile telephone are contained, said body further having a display screen mounted on an upper surface in operative connection to said components;
   first and second rigid side panels attached to said body by hinges to provide limited pivotal motion of said side panels with respect to said body, wherein said side panels are moveable between a first position in which said panels extend longitudinally, substantially in the plane of said body and a second position in which said panels extend downward transverse to the plane of said body to partially surround the wrist;
   a flexible band connected to said first and second panels to hold said mobile telephone on the wrist of the user;
   a housing having a clasp integral therewith, said clasp connected to said flexible band to allow said mobile telephone to be removably held on said wrist; and
   a battery, forming the power supply for said mobile telephone, mounted in said housing and connected to said mobile telephone through said flexible band.

7. A mobile telephone for wearing on the wrist of the user, as described in claim 6, further comprising a communication keypad connected to the components of said mobile telephone and mounted on at least one of said side panels.

8. A mobile telephone for wearing on the wrist of the user, as described in claim 6, wherein said mobile telephone is transformable, when removed from the wrist, to form a rigid substantially planar unit.

9. A mobile telephone for wearing on the wrist of the user, as described in claim 8, wherein, in the transformed position, said clasp housing engages the side panels to force said panels into said first position and to rigidly hold said panels in said first position.

10. A mobile telephone for wearing on the wrist of the user, as described in claim 6, wherein said side panels have a lower surface and a user interface, operatively connected to the components of said mobile telephone, is mounted on said lower surface for use when the device is removed from the wrist and wherein said side panels are in the first position.

11. A mobile telephone for wearing on the wrist of the user, as described in claim 10, wherein said user interface comprises:
   a microphone mounted on one of said side panels; and
   a speaker mounted on the other of said side panels.

12. A mobile communication device for wearing on the wrist of the user comprising:
   a planar body forming an enclosure in which the components of the mobile communication device are contained, said body further having a display screen mounted on an upper surface in operative connection to said components;
   first and second rigid side panels attached to said body by hinges to provide limited pivotal motion of said side panels with respect to said body, wherein said side panels are moveable between a first position in which said panels extend longitudinally, substantially in the plane of said body and a second position in which said panels extend downward transverse to the plane of said body to partially surround the wrist;
   a flexible band connected to said first and second panels to hold the device on the wrist of the user;
   a housing having a clasp integral therewith, said clasp connected to said flexible band to allow the device to be removably held on said wrist; and
   wherein, in the transformed position, said housing engages the side panels to force said panels into said first position and to rigidly hold said panels in said first position.

* * * * *